United States Patent Office.

WILLIAM G. MOORE, OF LONDON, CANADA, ASSIGNOR OF TWO-THIRDS TO WILLIAM RALPH AND THOMAS RALPH, OF SAME PLACE.

COMPOUND FOR PREVENTING ESCAPE OF AIR FROM PUNCTURED TIRES.

SPECIFICATION forming part of Letters Patent No. 598,324, dated February 1, 1898.

Application filed October 2, 1896. Serial No. 607,640½. (No specimens.)

*To all whom it may concern:*

Be it known that I, WILLIAM G. MOORE, a subject of the Queen of Great Britain, and a resident of the city of London, in the Province of Ontario, Canada, have invented a new and useful Compound for Preventing the Escape of Air from Punctured Tires, of which the following is a specification.

This invention relates to a composition of matter to be used for preventing the escape of compressed air from a pneumatic bicycle-tire or other receptacle when pierced by a sharp-pointed object.

My composition consists of the following ingredients combined in the proportions stated, viz: best glue, one pound; water, one quart; glycerin, two ounces; chloroform, two ounces.

In preparing the above compound the glue is placed in the water and the latter boiled until the glue is thoroughly dissolved and incorporated with the water. Then add the glycerin and again boil until the whole is thoroughly incorporated one with the other. Then remove the vessel containing this portion of the compound from the stove, and while it is yet warm and before it cools add the chloroform and thoroughly mingle by agitation.

The glue is valuable for giving the compound a strong and tough body and for causing it to adhere to the interior surface of the receptacle, and the glycerin and chloroform are valuable for keeping the compound soft, sticky, and inseparable.

While the compound is yet warm, it is pumped or otherwise introduced into the tire and the latter rotated to evenly coat the interior thereof, and said compound should be allowed to cool and settle well before using the coated article.

The practical advantages of this compound are that when the tire is punctured or pierced by a sharp-pointed object if the sharp-pointed object does not pierce the tire with great force it will not penetrate the compound on account of its toughness and inseparableness, and if said object penetrates the tire, but not the interior coating of said compound, the latter is of sufficient strength and toughness to prevent the escape of compressed air equal to the pressure required in a pneumatic bicycle-tire to retain the latter inflated, and thereby avoid and completely prevent the escape of the compressed air from a punctured pneumatic bicycle-tire. Again if the sharp-pointed object should be driven into the tire with sufficient force to extend through both the tire and the compound the latter is of such a sticky inseparable nature that it will bed and bind against and around the puncturing object, and even if the puncturing object should remain in the tire for any length of time the compound from its sticky and inseparable nature does not set, but closes the puncture immediately on the withdrawal of the puncturing object and avoids and prevents any appreciable loss of air from the tire, and, again, the compound, being of a strong and tough nature, adds to the strength, durability, and life of the tire.

Having thus described my invention, I claim—

A tire compound, composed of glue, glycerin, water, and chloroform, in or about the proportions specified.

In testimony whereof I have signed in the presence of the two undersigned witnesses.

WILLIAM G. MOORE.

Witnesses:
P. J. EDMUNDS,
S. McBAIN.